Feb. 28, 1956 B. J. SIMMONS 2,736,332
FLUID PRESSURE EQUALIZER
Filed Jan. 2, 1952
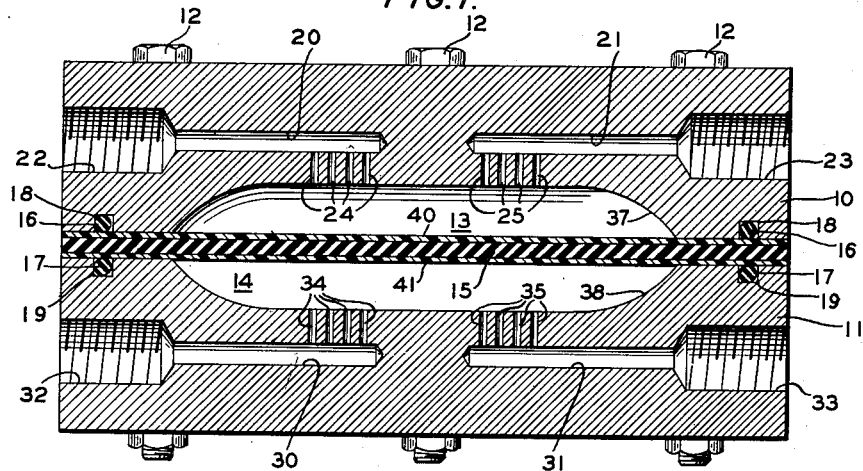
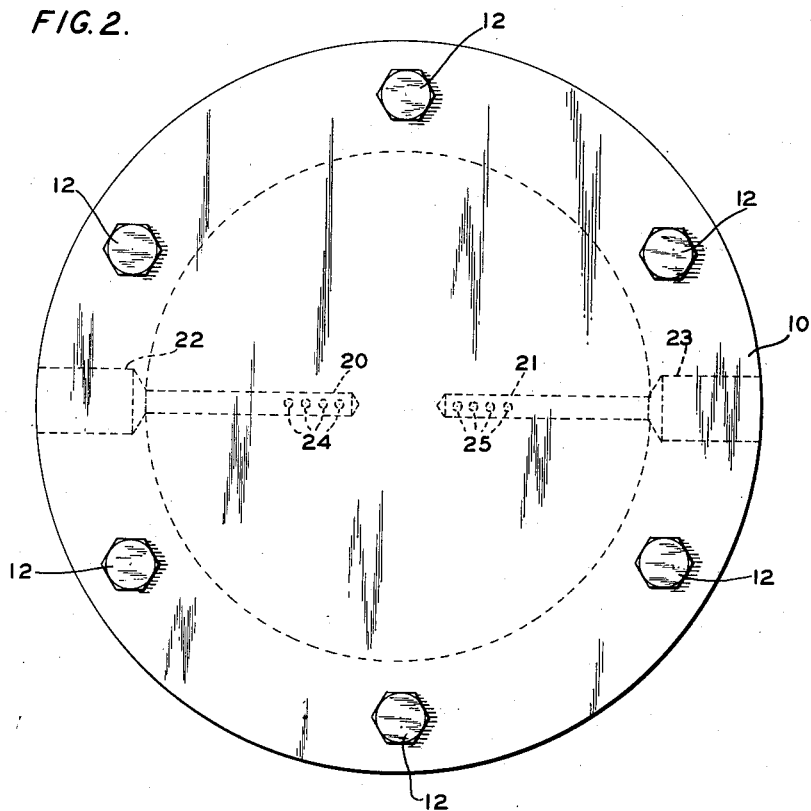
INVENTOR.
B. J. SIMMONS
BY Hudson & Young
ATTORNEYS

United States Patent Office 2,736,332
Patented Feb. 28, 1956

2,736,332

FLUID PRESSURE EQUALIZER

Bill J. Simmons, Bartlesville, Okla., assignor to Phillips Petroleum Company, a corporation of Delaware Application January 2, 1952, Serial No. 264,515

5 Claims. (Cl. 137—87)

This invention relates to fluid pressure equalizing means.

In the field of process control a number of instruments recently have been developed for the analysis of a selected fluid stream in comparison with a second fluid stream or stationary body of fluid with regard to some common optical property of the two fluids under consideration. Analyzers presently are known which compare either the refractive indexes or light absorption properties of the two fluids, for example. It is of course apparent that in such instruments the pressure of the two fluids must be equalized in order to obtain an accurate measurement of the particular optical property relied upon for the analysis. Since it is common practice to maintain the reference fluid static, even small temperature fluctuations tend to vary the pressure to such an extent as to introduce considerable error in the measurements. Accordingly, for accurate optical analysis it is important that means be provided to maintain equal pressure between the two fluids under comparison.

As means for maintaining accurate pressure control over two fluid bodies there is provided in accordance with the present invention an improved pressure equalizer in the form of adjacent fluid tight chambers separated by a common flexible diaphragm. Any pressure differential that may exist between the two fluids tends to displace the diaphragm from its initial position, thereby changing the relative volumes of the two chambers until the pressures on both sides of the diaphragm are equal. In order to prevent rupture of the diaphragm in the event of a large pressure differential being applied thereacross, the outer walls of the fluid chambers are formed as smooth concave surfaces and the fluid openings into the chambers are of small cross-sectional area, both of which tend to reduce the total strain on the diaphragm. These small openings also facilitate sealing of the fluid line in the event of a leak therein.

Accordingly, it is an object of this invention to provide means for equalizing pressure between two sources of fluid.

Another object is to provide a fluid pressure equalizer capable of withstanding large pressure differentials.

A further object is to provide a fluid pressure equalizer device which prevents contamination of the fluids under consideration.

A still further object is to provide a fluid pressure equalizer for carrying out the above mentioned objects which is economical to construct, reliable in operation, sensitive to small pressure differentials and which utilizes a minimum number of simple components.

Various other objects, advantages, and features of this invention should become apparent from the following description taken in conjunction with the accompanying drawings in which:

Figure 1 is a side view, shown partially in section, of the pressure equalizer of this invention; and Figure 2 is a top elevation view of the pressure equalizer of Figure 1.

Referring now to the drawing in detail, there is illustrated a pressure equalizer which comprises a pair of circular metal plates 10 and 11 rigidly secured to one another by a plurality of bolts such as 12. The inner opposing faces of plates 10 and 11 are provided with concave cavities 13 and 14, respectively, adjacent one another. A circular diaphragm 15 of flexible material is interposed between the opposing faces of plates 10 and 11, thereby separating cavities 13 and 14 from one another and in so doing providing a pair of fluid tight chambers of approximately equal volume. A pair of radial passages 20 and 21 are drilled in upper plate 10, the outer portions 22 and 23, respectively, being enlarged and threaded to receive suitable inlet and outlet conduits, not shown; and a plurality of small holes 24 are drilled between cavity 13 and passage 20 to establish communication therebetween. Similar holes 25 are drilled between cavity 13 and passage 21. Lower plate 11 is provided with similar radial passages 30 and 31 having enlarged outer sections 32 and 33, respectively, also threaded to receive suitable inlet and outlet conduits, not shown. A plurality of small holes 34 is drilled between cavity 14 and passage 30 and a plurality of similar holes 35 is drilled between cavity 14 and passage 31.

From the foregoing description it should be apparent that the pressure equalizing device comprises two equal volume fluid tight chambers 13 and 14 separated by a common flexible diaphragm 15. Chamber 13 is provided with an inlet passage 20 and an outlet passage 21 for establishing communication between chamber 13 and a first source of fluid under consideration; and chamber 14 is provided with inlet passage 30 and an outlet passage 31 for establishing communication between a second source of fluid, the pressure of which is to be equalized with the pressure of the first fluid communicating with chamber 13. As long as the pressures in the two chambers are equal, diaphragm 15 remains at an initial position thereby maintaining the two chambers 13 and 14 at equal volumes. However, should the pressure in chamber 13, for example, exceed the pressure in chamber 14 then diaphragm 15 is deflected downward until the relative change in volumes between the two chambers is of sufficient magnitude to equalize the pressures of the two fluids contained therein. Of course, it should be apparent that the relative volumes of chambers 13 and 14 must be of sufficient size in comparison with the total volumes of the two sources of applied fluid that the change in volume provided by the displacement of diaphragm 15 is sufficient to equalize the pressures thereacross.

By forming the cavity walls 37 and 38 of plates 10 and 11, respectively, as smooth concave surfaces, the resulting strain on diaphragm 15 is materially lessened should the pressure differential between the two chambers be of sufficient magnitude to press the diaphragm against either of these cavity walls. In addition, the cross sectional areas of holes 24, 25, 34 and 35 are sufficiently small so that the diaphragm is not extruded therethrough by the maximum operating pressure differential attainable in the system. These cross-sectional areas are related to the thickness and material of the diaphragm in addition to the maximum pressure differential possible and flow rates. A construction of this type is valuable, for example, if a leak or rupture should develop in the fluid line communicating with chamber 14 so that the fluid pressure in chamber 13 forces diaphragm 15 against cavity wall 38, thereby sealing the openings across holes 34 and 35. This prevents any loss of fluid between inlet and outlet passages 30 and 31.

One important application of this invention is in conjunction with a differential refractometer. The differential refractometer is an instrument for comparing the refractive index of an unknown fluid stream with the refractive index of a standard static fluid sample. A split sample cell is provided through which a narrow beam of light is transmitted. Any difference in refractive indexes between the two fluids under comparison, which fill the two sides of the split sample cell, causes a deviation of the light beam from its original path, the degree of this deviation being indicative of the difference in refractive indexes between the two fluids. In order to obtain accurate results it is of course essential that the pressures of the two fluids under comparison be equal at all times. This is accomplished by connecting chamber 13 of the pressure equalizer with the static reference fluid by means of suitable connecting conduits. The unknown fluid is circulated continuously through the refractometer cell and chamber 14 of the pressure equalizer. In this manner any pressure differential that exists between the two fluids is eliminated by the displacement of diaphragm 15. In the pressure equalizer employed in such a refractometer, diaphragm 15 is constructed of a neoprene sheet approximately $\frac{1}{32}$" in thickness, and holes 24, 25, 34 and 35 are drilled $\frac{1}{32}$" in diameter. In order to prevent possible contamination of the standard fluid sample by chemicals in the neoprene diaphragm, a thin sheeting of Teflon (polymerized tetrafluoro ethylene) 40 is disposed adjacent diaphragm 15 on the upper side thereof, said sheeting being of sufficient size to allow for displacement of diaphragm 15. Teflon is an extremely inert substance which has little tendency to react with organic fluids which may be passed through the pressure equalizer. A similar sheet of Teflon 41 can be provided on the underside of diaphragm 15, if desired, although this is not essential if the unknown sample stream is purged after passing through the pressure equalizer. If the Teflon sheets are employed, sealing rings 16 and 17 are disposed in recessed annular rings 18 and 19, respectively, in plates 10 and 11, respectively. Sealing rings 16 and 17 are not needed in the absence of the Teflon sheets because the neoprene is effective as a sealing agent.

While this invention has been described in conjunction with precision analysis instruments, it should be emphasized that its use is by no means limited thereto. The features of this invention are applicable to various fields of pressure equalization. For example, in oil well logging, it often is desirable to equalize the pressure within the logging instrument with that of fluids filling the bore hole, and an instrument of the type herein described effectively can be employed in this manner. As previously pointed out, the only requirement for effective pressure equalization is that the volumes of chambers 13 and 14 be sufficiently large in comparison with the volumes of the fluids under consideration that maximum flexure of diaphragm 15 is sufficient to equalize the pressures between the two fluids.

From the foregoing it should thus be apparent that various modifications can be made by those skilled in the art without departing from the scope of this invention.

Having described my invention, I claim:

1. Means for equalizing the pressures of a static body of fluid and a flowing body of fluid comprising, in combination, first and second adjacent plates having a flexible diaphragm interposed therebetween, the opposing faces of said plates being provided with smooth concave walls thereby forming two opposing chambers separated by said diaphragm, said first plate being provided with first and second spaced passages each communicating between a region exterior of said first plate and a region within said first plate adjacent the chamber in said first plate, said first plate also being provided with a plurality of third passages extending between each of said first and second passages and the chamber in said first plate thereby forming separate inlet and outlet openings for the chamber in said first plate whereby the flowing body of fluid can be circulated through the chamber in said first plate, said second plate being provided with fourth and fifth spaced passages each communicating between a region exterior of said second plate and a region within said second plate adjacent the chamber in said second plate, said second plate being provided with a plurality of sixth passages extending between each of said fourth and fifth passages and the chamber in said second plate thereby forming separate inlet and outlet openings for the chamber in said second plate whereby the static body of fluid can be circulated through the chamber in said second plate, and sealing means providing fluid-tight connections between said first plate and said diaphragm and between said second plate and said diaphragm, said diaphragm being deflected by unequal pressures in the chambers in said first and second plates, said third and sixth passages remaining unobstructed irrespective of the pressure differential across said diaphragm.

2. A fluid pressure equalizing device comprising, in combination, first and second plates positioned adjacent one another, a flexible diaphragm positioned between said plates, the opposing faces of said plates being provided with recessed cavities thereby forming two opposing chambers separated by said diaphragm, said first plate being provided with spaced inlet and outlet first passages and a plurality of holes extending between each of said first passages and the chamber in said first plate, said second plate being provided with spaced radially inlet and outlet second passages and a plurality of holes extending between each of said second passages and the chamber in said second plate, said diaphragm being deflected by unequal pressures in the chambers in said first and second plates, the holes communicating with the chamber on the high pressure side of said diaphragm remaining unobstructed irrespective of the pressure differential across said diaphragm, said diaphragm being constructed and disposed to engage and seal either outlet passage of either chamber upon failure of pressure therein, the thickness of said diaphragm and the cross sectional area of said holes being such as to prevent extrusion of said diaphragm through said holes irrespective of the pressure differential across said diaphragm.

3. A fluid pressure equalizing device comprising, in combination, first and second circular flat metal plates having a flexible diaphragm positioned therebetween, the opposing faces of said plates being provided with smooth concave walls which form two opposing chambers separated by said diaphragm, said first plate being provided with spaced radial inlet and outlet first passages and a plurality of holes extending between said first passages and the chamber in said first plate, said second plate being provided with spaced radial inlet and outlet second passages and a plurality of holes extending between said second passages and the chamber in said second plate, said diaphragm being deflected by unequal pressures in the chambers in said first and second plates, the holes communicating with the chamber on the high pressure side of said diaphragm remaining unobstructed irrespective of the pressure differential across said diaphragm.

4. The combination in accordance with claim 3 wherein the thickness of said diaphragm and the cross-sectional areas of said holes are such as to prevent extrusion of said diaphragm through said holes irrespective of the pressure differential across said diaphragm.

5. The combination in accordance with claim 3 wherein said flexible diaphragm is constructed of neoprene, and further including a sheath of Teflon disposed on at least one side of said diaphragm and making fluid tight connection between said diaphragm and the adjacent chamber.

References Cited in the file of this patent

UNITED STATES PATENTS

| 790,584 | Manning et al. | May 23, 1905 |
| 1,086,862 | Schneider | Feb. 10, 1914 |

(Other references on following page)

UNITED STATES PATENTS

| | | |
|---|---|---|
| 1,539,630 | Beaird | May 26, 1925 |
| 1,593,618 | Andursky | July 27, 1926 |
| 1,879,940 | Mangiameli | Sept. 27, 1932 |
| 1,898,020 | Roe | Feb. 21, 1933 |
| 1,967,690 | Sherman | July 24, 1934 |
| 2,145,114 | Gibbs et al. | Jan. 24, 1939 |
| 2,185,023 | Crane | Dec. 26, 1939 |
| 2,400,048 | Jones | May 7, 1946 |
| 2,590,324 | Jones | Mar. 25, 1952 |
| 2,638,127 | Griswold | May 12, 1953 |
| 2,654,559 | Franck | Oct. 6, 1953 |

FOREIGN PATENTS

| | | |
|---|---|---|
| 323,785 | France | Nov. 20, 1902 |
| 393,791 | Great Britain | June 15, 1933 |